United States Patent Office 2,926,706
Patented Mar. 1, 1960

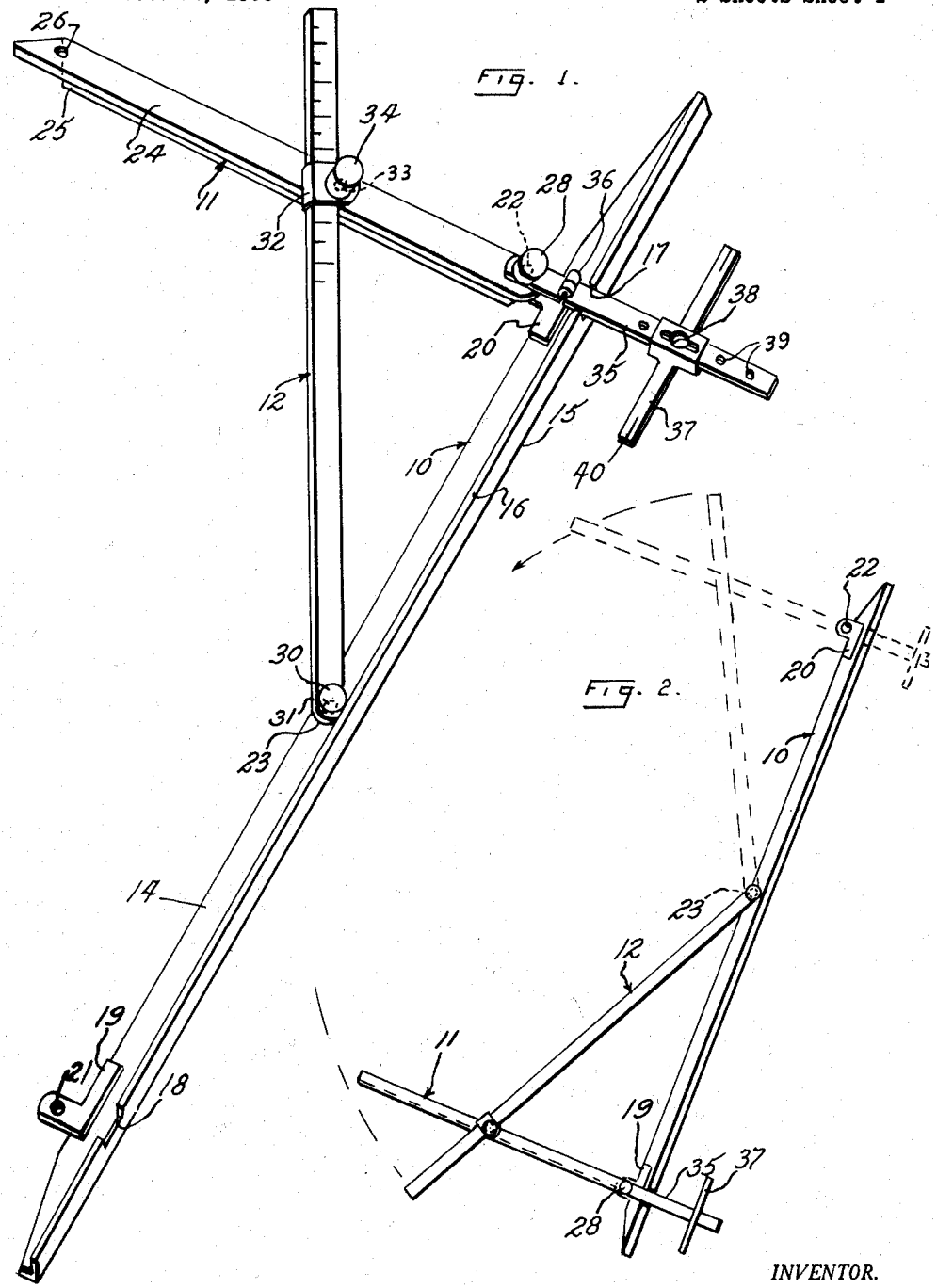

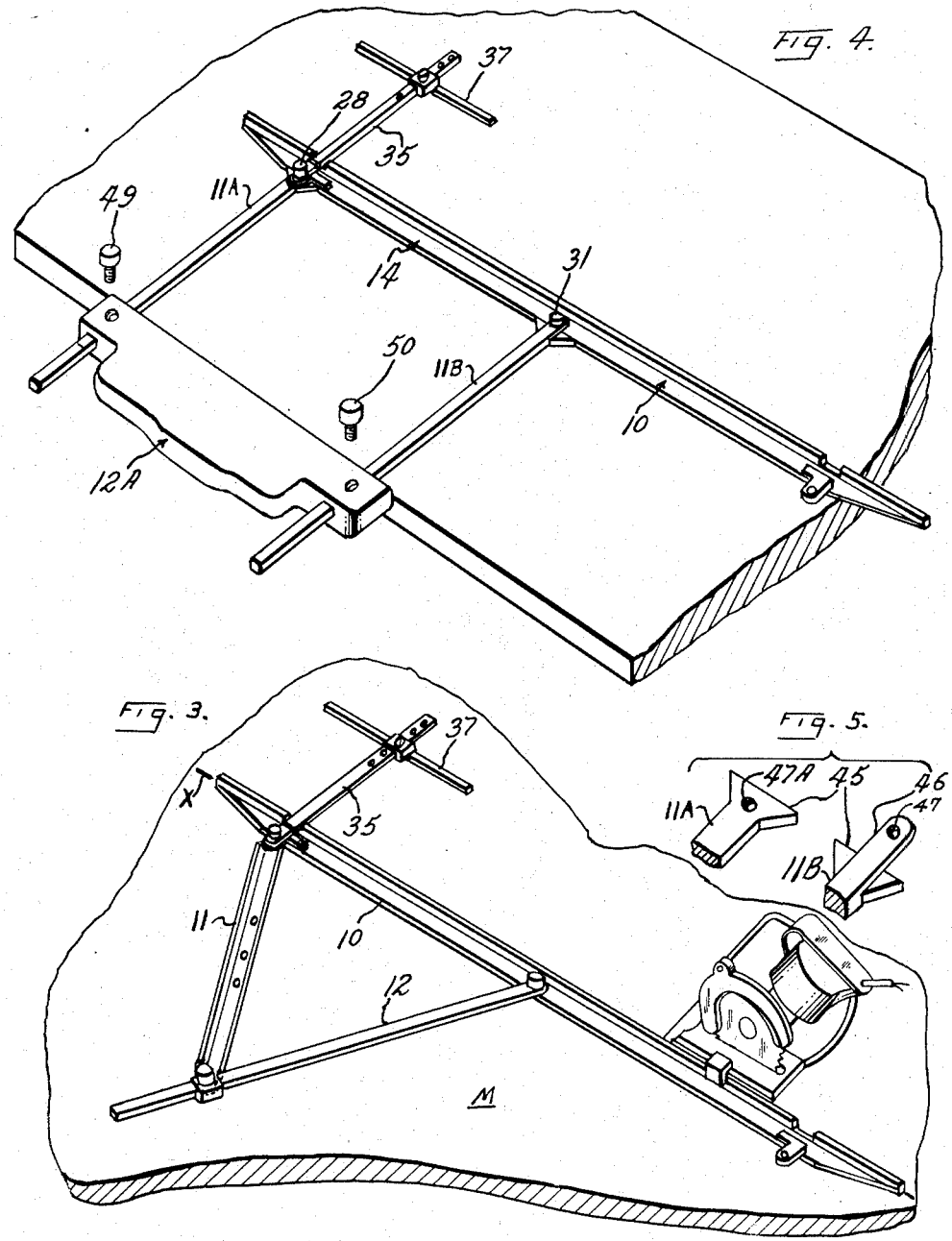

2,926,706

CROSS-CUT AND RIP GUIDE DEVICE FOR PORTABLE POWER SAWS

Lloyd M. Hopla, Keyport, N.J.

Application October 29, 1956, Serial No. 618,959

6 Claims. (Cl. 143—6)

This invention relates to my co-pending application Serial No. 284,857, filed April 29, 1952, and issued December 11, 1956, as Patent #2,773,523.

This invention relates to portable power driven saws and more particularly to a saw guide. Power hand saws of the type referred to are used extensively for cutting wood and other materials. The power saw comprises a housing in which an electric motor is mounted and the motor in turn is operatively connected to the saw blade. In some instances the housing is supported on a flat frame, platform or bed on which the saw rests. With a power saw it is desirable to have a guiding means during the cutting operation to effect greater accuracy and this invention is primarily concerned with this guiding means. In this invention the guide is not necessarily attached to the power saw and the user may readily utilize the saw with or without the guide according to the cutting operation. There have been numerous devices for guiding power operated saws and for supportnig the saw in a fixed position for sawing operations. However these devices are either appreciable in size and weight or their cost prohibitive.

In the prior application the saw guide described and illustrated was primarily a cross cut guide and since the majority of people are right handed it was designed primarily to be actuated by the left hand while the saw was manipulated by the right hand. Since filing the prior application it has become apparent that this device should be constructed so that it may be reversed to be manipulated by a left handed person, that is, the guide to be operated with the right hand while the saw is manipulated with the left hand. In addition to the uses of the guide as described in the prior application it has become apparent that the guide when modified could be utilized as a rip guide. In one instance the rip guide is used in a similar manner to the cross cut guide described in the prior application, that is, the rip guide is movable along one edge of the lumber to be cut. In guiding the saw along the grain of the wood and as suggested above, this embodiment of the invention is also reversable to make it either a left handed or right handed guide. In addition the modified guide is formed so that the guide element may be inverted to provide a perfectly flat surface for the guide with relation to the element or lumber to be cut. In this embodiment the guide is simply manually moved along a flat surface to provide a steadying guide in a rip cutting operation. A still further embodiment of this invention contemplates the installation of the sighting gauge at either end of the saw guide depending upon the application of the guide in a left handed position or in a right handed position.

The object of this invention is to provide a guide for power saws that will greatly increase their usefulness and accuracy without detracting from their normal use.

A further object of this invention is to provide a guide for power saws that is not affixed to the saw and is simple in construction, light in weight and easily affixed to the work for a cutting operation.

A still further object of this invention is to provide a guide for power saws in which the guide is positioned to rest upon the material to be cut and in which one portion of the guide will rest against one side of the material which is the guiding edge to thus maintain the guide in position for a cutting operation.

A still further object of this invention is to provide a guide for power saws in which the guide is positioned to rest upon the material to be cut and in which one portion of the guide will rest against one side of the material which is the guiding edge to thus maintain the guide in position for a cutting operation and another portion of the guide resting upon the material is provided with a guiding track to partially support and guide a power saw.

A still further object of this invention is to provide a guide for power saws in which the guide is positioned to rest upon the material to be cut and in which one portion of the guide will rest against one side of the material which is the guiding edge to thus maintain the guide in position for a cutting operation and another portion of the guide resting upon the material is provided with a guiding track to partially support and guide a power saw and in which means are provided to position said second element a predetermined distance from the cutting operation depending upon the position of the saw blade with relation to the guiding track.

A still further object of this invention is to provide a guide for power saws in which the guide is positioned to rest upon the material to be cut and in which one portion of the guide will rest against one side of the material which is the guiding edge to thus maintain the guide in position for a cutting operation and another portion of the guide resting upon the material is provided with a guiding track to partially support and guide a power saw and in which means are provided to pivotally move said guide to a predetermined position to guide the power saw in an angular cut.

A still further object of this invention is to provide an adjustable guide for power operated hand saws in which the guide is placed upon the material to abut with one edge of the material in a manner to guide the power saw along the length of the material in a ripping operation.

A still further object of this invention is to provide an adjustable guide for power operated hand saws in which the guide is placed upon the material to abut with the left side of the material to be manipulated by the left hand in a manner to guide the power saw along the length of the material in a ripping operation.

A still further object of this invention is to provide an adjustable guide for power operated hand saws in which the guide is placed upon the material to abut with the right side of the material to be manipulated by the right hand in a manner to guide the power saw along the length of the material in a ripping operation.

A still further object of this invention is to provide an adjustable guide for power operated hand saws in which the guide is placed upon the material to abut with one edge of the material and in which means are provided to pivotally support the guide to guide the power saw in a predetermined angular cut.

A still further object of the invention is to provide an adjustable guide for power operated hand saws in which the guide is placed upon the material to abut with one edge of the material and in which means are provided to pivotally support a curved guide to guide the power saw in a predetermined curved cut.

A still further object of this invention is to provide an adjustable guide for power operated hand saws in which the guide is placed upon the material to abut with one edge of the material and in which means are provided to pivotally support the guide to guide the power saw in a predetermined angular cut and in which the guide is provided with calibrations so that the guide may be used as a calibrated square as well as the guiding means for a power saw.

A still further object of this invention is to provide an adjustable guide for power operated hand saws in which the guide may be placed upon the flat surface of the material and in which the guide is located by means of a mark or line on the material and retained in this position to provide a guiding edge for a power operated saw.

A still further object of this invention is to provide an adjustable guide for power operated hand saws in which the guide may be placed upon the flat surface of the material and in which the guide may be located in a spaced relation to a line or mark by means of a sighting gauge at one end thereof.

A still further object of this invention is to provide an adjustable guide for power operated hand saws in which the guide may be placed upon the flat surface of the material and in which the guide may be located in a spaced relation to a line or mark by means of a sighting gauge at one end thereof and in which the guide is reversable with means to place the sighting gauge at the opposite end thereof so that the guide may be used by either a right handed or left handed operator.

Other objects of this invention may be apparent by reference to the accompanying detailed description and the drawings in which Fig. 1 is a perspective view illustrating a cross cut saw guide, Fig. 2 is a perspective view illustrating the same guide as shown in Fig. 1 but adjusted to a position for the opposite hand operation, Fig. 3 is a perspective view illustrating the same guide re-adjusted for operation on a flat surface, Fig. 4 is a further embodiment illustrating in perspective a further saw guide, and Fig. 5 is an enlarged detail of one portion of the guide of Fig. 4.

Referring to the drawings there is illustrated in Figs. 1, 2 and 3 a saw guide which is specifically designed to produce the exact guidance necessary for a power hand saw wherein the saw may be provided with a shoe (not shown) and in which the shoe will rest upon and be guided along the length of the saw guide. The saw guide comprises three elements 10, 11 and 12, element 10 being the main guide track for the saw. Element 10 is an angle iron positioned with its base 14 to rest upon the work to be cut and having the upper edge 16 of the upright face 15 as the guiding edge of the shoe of the power saw. Element 10 is provided with two cut out portions 17 and 18 provided for a sighting gauge to be explained later. Element 10 is also provided with two brackets 19 and 20 that are affixed to the base 14 at either end thereof. Brackets 19 and 20 are provided with apertures 21 and 22. Element 10 is also provided with a threaded aperture 23 through its base 14 at the center of the length of element 10. Element 11 is an angle iron inverted with relation to element 10 so that its base portion 24 will lie upon the surface of the work to be cut while the right angular leg 25 is utilized to abut with the edge of the work. Element 11 is provided with a threaded aperture 26 at either end thereof. In the position illustrated in Fig. 1, element 11 is positioned at right angles to and at the left hand side of element 10 and is secured to element 10 by means of a set screw 28, the set screw 28 being passed through apertures 22 and threaded into aperture 26. Element 12 is a perfectly flat rigid member provided with an aperture 30 at one end thereof to permit a set screw 31 to be passed through aperture 30 and threaded into aperture 23 of element 10 to thus retain element 12 in a pivoted relation to element 10. Element 12 is provided with a slideable shoe 32. The shoe 32 is provided with an aperture 33 through which a set screw 34 is mounted. Set screw 34 is in turn threadably secured in a threaded aperture in element 11 as illustrated in Fig. 1. Although element 11 is shown at 90° to element 10 it is apparent that element 11 may be pivotally moved with relation to element 10 and may be secured in any angular relationship from approximately 5° to 170° with relation to element 10.

With the type of hand saw to be utilized in connection with this guide the saw blade is set at a predetermined distance from the left hand edge of the saw. This distance will vary with different makes of saws. Therefore a sighting gauge must be utilized with the saw guide. The sighting gauge permits the operator or user to thus set the saw guide before a cutting operation. The sighting gauge is illustrated in Fig. 1 and includes a hinged element 35. The left hand side of the hinge 36 is mounted to element 20 and may be retained by the same set screw 28 by simply providing an aperture in the hinged element. It is to be noted that when set screws 28 is mounted it will pass through element 36, bracket 20 and will be threadably mounted in element 11. Element 35 is of a correct dimension to fit snugly between the edges of the cut out portion 17 of the upright portion 15 of element 10. Thus element 35 may be moved out of position retracted or may be moved into position as shown in Fig. 1. Element 35 is further provided with a sighting bar 37. The bar 37 is affixed by means of a screw 38, screw 38 in turn being settable into any one of a plurality of apertures 39 in element 35. The sighting bar 37 is also provided with an elongated slot 40 so that bar 37 may be moved slightly in either direction before screw 38 is set to thus place bar 37 in a very exact position. Bar 37 may be very small in cross section to provide a line sight or bar 37 may be provided with mark thereon for sighting. Referring to Fig. 2 which is the same guide, it is apparent that the guide of Fig. 1 which is normally utilized by a right handed person may be converted so that it may be used by a left handed operator or person. This is accomplished by first removing the sighting gauge by removing set screw 28. The sighting gauge will then be moved to the opposite end of element 10 and likewise element 11 will be pivotally moved while still attached to element 12 until aperture 26 is aligned with aperture 21. The set screw 28 and gauge element 35 may then be set through apertures 21 and 26 to position the guide as illustrated in Fig. 2. It is apparent that the guide as shown in Fig. 2 may be positioned against the opposite edge of the lumber and thus may be used by a left handed person to cut from the opposite side or the complete gauge may be lifted and positioned as in Fig. 1. Everything will be reversed for a left handed operator, the gauge being held by the right hand while the saw is held by the left hand. Referring to Fig. 3 there is illustrated the same gauge and same elements except that in this instance the gauge is not to be positioned with relation to either edge of the lumber being cut. Instead the gauge is to lie flat upon the surface of the material M and is positioned with relation to mark X on the surface of the material as illustrated in Fig. 3. Referring to the elements described in Fig. 1 the set screw 28 is removed and the element 11 is released from element 10. By removing set screw 34 element 11 is released from element 12. Element 11 is then inverted so that its base 24 will lie face down upon the work to be cut while the edge or leg 25 will stand at right angles and up from the work as shown in Fig. 3. Set screw 28 is again mounted through aperture 22 and threaded into aperture 26 to retain element 11 in a pivotal relation with element 10. Element 12 is then set by means of the set screw 34, the set screw 34 being mounted in the opposite end of element 11 in aperture 26 to thus retain elements 10, 11 and 12 in a set relationship as illustrated. Thus the complete guide provides a flat lower surface to be moved along the surface of a large panel but thus provides a track or guiding edge for a power saw to permit the operator to make a perfectly clean straight cut. It is further apparent that if the panel to be cut is large it is simply a matter of making one cut with the saw using the guide as shown and stopping the cutting operation long enough to move the guide a further step forward and having set the guide by means of the sighting gauge the sawing operation may be continued until the panel has been completely cut. This application of the guide to a flat surface permits either a cross cut or a rip operation as the case may be.

Referring to Figs. 4 and 5 there is illustrated a further embodiment of this invention which is primarily a rip guide. The guide includes the same element 10 illustrated in Figs. 1, 2 and 3 but element 11 is replaced by a pair of arms 11A and 11B and element 12 of the prior embodiment is replaced by a handle 12A. The sighting gauge and all of its elements are exactly as illustrated in Figs. 1, 2 and 3. The arms 11A and 11B for a right handed operator of a power saw are positioned as illustrated in Fig. 4. The center arm (11B) is provided with an abutting face 45 (Fig. 5) and a portion 46 that extends far enough to place an aperture 47 directly over the threaded aperture 23 of element 10. The arm 11A is provided with a threaded aperture 47A to be placed under aperture 22 of element 10 to receive set screw 28. It is to be noted that the end of element 11A will abut with the edge of element 10. Thus when elements 11A and 11B are positioned as illustrated in Fig. 4 with their abutting face 45 against the edge of the base 14 of element 10 the set screws 28 and 31 may be mounted as illustrated to retain elements 10, 11A and 11B in a rigid relationship as illustrated. It is to be noted that elements 11A and 11B may be of various forms, round, square or rectangular without departing from the spirit of this invention. In this instance they are square in shape and therefore the handle 12A must be provided with a pair of square shaped apertures at either end thereof to permit the handle to slide over elements 11A and 11B. It is to be noted that handle 12A is provided with a pair of threaded apertures one at each end thereof for set screws 49 and 50. Thus it is apparent that with set screws 49 and 50 mounted in the threaded apertures of the handle 12A the handle 12A may be set at any particular position along the length of elements 11A and 11B but will always be set in a parallel relation with element 10. Thus the rip guide as shown in Fig. 4 may be set with relation to a desired cut along the length of material such as lumber. It is also apparent that as in Fig. 2 the guide may be taken apart and element 11A may be moved to the opposite end of element 14 as well as the sighting gauge and the handle 12A may be remounted on element 11A and 11B and thus the guide becomes a right handed movable guide for a left handed operator of a saw.

Although there is illustrated a cross cut guide for power operated saws in Figs. 1, 2 and 3 this cross cut guide as illustrated in Fig. 3 is also useable as a rip guide and it is to be understood that although the guide is provided for power operated hand saws the guide may be utilized with any hand operated saw utilizing the guide with a shoe for the saw as described or the guide may be used to abut against the surface of the saw without departing from the spirit of this invention. Although a particular means in the form of a special handle has been illustrated in Fig. 4 for a further embodiment of this invention, the handle may take other forms or may be mounted in a different manner without departing from the spirit of this invention and this invention shall be limited only by the appended claims.

What is claimed is:

1. The combination of a saw guide and a sighting gauge in which the saw guide that is movable with relation to the work to be cut includes a first, second and third arm, said first arm provided with means adjacent either end and its center for pivotal attachment, said second arm pivotally connected to said first arm at one end thereof, said third arm pivotally connected at one end thereof to said first arm at its center and adjustably attached to said second arm, said first arm provided with an upturned face and said second arm provided with a down turned face, said first arm provided with a pair of notches in said upturned face, each notch in alignment transversely of said first arm with the means for pivotally attaching said second arm, said sighting gauge attachable to said first arm at the point of attachment of said second arm and retained in an aligned position by said notch in said upturned face, said sighting gauge pivotally movable about an axis parallel to said first arm into an extended position for use and pivotally movable into a retracted position when not in use, said sighting gauge provided with a sighting blade that may be moved to any position perpendicular to and horizontally along said gauge to indicate a predetermined spaced position from the upturned face of said first arm to determine the saw cutting plane, means to set said sighting blade the same distance from said upturned guide track face of said first arm to agree with the distance of the setting of the saw blade of the power saw from the portion of the saw that rides on said upturned guide track face.

2. In a device according to claim 1 in which the second arm and the sighting gauge are mounted at the left hand end (as viewed from the attaching side) of said first arm to permit the operator to grasp the device in the left hand while operating the saw with the right hand.

3. In a device according to claim 1 in which the second arm and the sighting gauge are mounted at the right hand end (as viewed from the attaching side) of said first arm to permit the operator to grasp the device in the right hand while operating the saw with the left hand.

4. The combination of a rip saw guide and a sighting gauge, in which the rip saw guide that is movable with relation to the work to be cut, includes a first, second and third arm, said first arm provided with means adjacent either end and its center for pivotal attachment, said second arm pivotally connected to said first arm at one end thereof, said third arm pivotally connected at one end thereof to said first arm at its center, and adjustably attached to said second arm, said first and second arms provided with an upturned face, said first arm provided with a pair of notches in said upturned face, each notch in alignment transversely of said first arm, with a means for pivotally attaching said second arm, said sighting gauge attachable to said first arm at the point of attachment of said second arm, and retained in an aligned position by said notch in said upturned face, said sighting gauge pivotally movable about an axis parallel to said first arm into an extended position for use and pivotally movable into a retracted position when not in use, said sighting gauge provided with a sighting blade that may be moved to any position perpendicular to and horizontally along said gauge to indicate a predetermined spaced position from the upturned face of said first arm to determine the saw cutting plane, means to set said sighting blade the same distance from said upturned guide track face of said first arm to agree with the distance of the setting of the saw blade of the power saw from the portion of the saw that rides on said upturned guide track face, and means for adjustably positioning said third arm with relation to the unattached end of said second arm to provide a hand guided rip guide that is slidable along the surface of the work to be cut.

5. In a device according to claim 4, in which the second arm and the sighting gauge are mounted at the left hand end (as viewed from the attaching side) of said first arm to permit the operator to grasp the device in the left hand while operating the saw with the right hand.

6. In a device according to claim 4, in which the second arm and the sighting gauge are mounted at the right hand end (as viewed from the attaching side) of said first arm to permit the operator to grasp the device in the right hand while operating the saw with the left hand.

References Cited in the file of this patent
UNITED STATES PATENTS

| | | |
|---|---|---|
| 2,513,497 | Laughlin | July 4, 1950 |
| 2,632,483 | Jamack | Mar. 24, 1953 |
| 2,677,399 | Getsinger | May 4, 1954 |
| 2,711,194 | Fisher | June 21, 1955 |
| 2,735,455 | Forsberg | Feb. 21, 1956 |
| 2,773,523 | Hopla | Dec. 11, 1956 |
| 2,823,709 | Konieczka | Feb. 18, 1958 |